US008550902B2

(12) United States Patent
Bennett

(10) Patent No.: US 8,550,902 B2
(45) Date of Patent: Oct. 8, 2013

(54) GAMING SYSTEM AND A METHOD OF GAMING

(75) Inventor: Nicholas Luke Bennett, Manley Vale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 1076 days.

(21) Appl. No.: 12/190,943

(22) Filed: Aug. 13, 2008

(65) Prior Publication Data

US 2009/0181753 A1 Jul. 16, 2009

(30) Foreign Application Priority Data

Aug. 14, 2007 (AU) ................................ 2007904365

(51) Int. Cl.
*A63F 13/00* (2006.01)

(52) U.S. Cl.
USPC ................... 463/25; 463/12; 463/13; 463/16; 463/17; 463/18; 463/19; 463/20; 463/43

(58) Field of Classification Search
USPC ........................ 463/16–20, 25, 12–13, 22, 43
See application file for complete search history.

(56) References Cited

U.S. PATENT DOCUMENTS

| | | | | |
|---|---|---|---|---|
| 5,350,175 | A | 9/1994 | Dilullo et al. | |
| 5,573,248 | A | 11/1996 | Parra et al. | |
| 5,775,692 | A | 7/1998 | Watts et al. | |
| 6,569,015 | B1 | 5/2003 | Baerlocher et al. | |
| 2002/0183105 | A1 * | 12/2002 | Cannon et al. | 463/16 |
| 2003/0064787 | A1 | 4/2003 | Weiss | |
| 2004/0097286 | A1 | 5/2004 | Vancura | |
| 2004/0166929 | A1 | 8/2004 | Tarantino | |
| 2004/0214630 | A1 | 10/2004 | Mayeroff | |
| 2005/0026676 | A1 | 2/2005 | Olive | |
| 2005/0236767 | A1 | 10/2005 | Parsadaian et al. | |
| 2005/0288092 | A1 | 12/2005 | Ellis | |
| 2006/0068893 | A1 * | 3/2006 | Jaffe et al. | 463/20 |
| 2006/0089195 | A1 * | 4/2006 | Walker et al. | 463/25 |
| 2006/0205491 | A1 | 9/2006 | Daley | |
| 2007/0040333 | A1 | 2/2007 | Au-Yeung | |
| 2007/0060297 | A1 | 3/2007 | Hein et al. | |

FOREIGN PATENT DOCUMENTS

| | | |
|---|---|---|
| CA | 2399393 | 8/2001 |
| CA | 2403032 | 3/2003 |
| CA | 2545652 | 11/2006 |
| CA | 2559995 | 12/2006 |
| GB | 2386565 | 9/2003 |
| GB | 2395439 | 5/2004 |
| GB | 2429563 | 2/2007 |
| WO | WO03028825 | 4/2003 |

* cited by examiner

*Primary Examiner* — Sunit Pandya
(74) *Attorney, Agent, or Firm* — Hanley, Flight and Zimmerman, LLC

(57) ABSTRACT

A method of gaming comprising: receiving a bet from a player; awarding to the player an entitlement to a plurality of game outcomes in exchange for the bet; determining that the player has exhausted the entitlement; and determining, subsequent to exhaustion of the entitlement, whether the player is entitled to an award based, at least in part, on at least one of the game outcomes.

36 Claims, 8 Drawing Sheets

800A

| | | | | | |
|---|---|---|---|---|---|
| 810 | 9 | K | Star | J | 10 |
| 820 | A | A | A | 9 | J |
| 830 | J | J | J | Star | 9 |

Figure 8a

800B

| | | | | | |
|---|---|---|---|---|---|
| 810 | A | K | Q | Star | 8 |
| 820 | 9 | 9 | 10 | 9 | J |
| 830 | K | Star | J | 10 | Star |

Figure 8b

900

910

| | | | | |
|---|---|---|---|---|
| A | K | Q/Star | Star | 8 |
| 9 | 9 | 10 | 9 | J |
| K | Star | J | 10/Star | Star |

920

Figure 9

GAMING SYSTEM AND A METHOD OF GAMING

CROSS-REFERENCE TO RELATED APPLICATIONS

The present application claims the benefit of priority to Australian Provisional Patent Application No. 2007904365, filed on Aug. 14, 2007, entitled "A Gaming System and a Method of Gaming", which is herein incorporated by reference in its entirety.

FIELD

The present invention relates to a gaming system, a method of gaming, a game controller and computer program code.

BACKGROUND TO THE INVENTION

It is known to provide a gaming system which includes a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

While such gaming systems provide users with enjoyment, a need exists for alternative gaming systems in order to maintain or increase player enjoyment.

SUMMARY OF THE INVENTION

In a first aspect, the invention provides a method of gaming including:

receiving a bet from a player;

awarding to the player an entitlement to a plurality of game outcomes in exchange for the bet;

determining that the player has exhausted the entitlement; and determining, subsequent to exhaustion of the entitlement, whether the player is entitled to an award based, at least in part, on at least one of the game outcomes.

In an embodiment, the method includes determining whether the player has exhausted the entitlement by refusing to obtain at least one of the game outcomes.

In an embodiment, the method includes providing the player with an option to accept a current game outcome or to obtain a further game outcome, whereby the player has the option to refuse the further game outcome.

In an embodiment, the method includes determining whether the player is entitled to the award based on each of the multiple game outcomes.

In an embodiment, the award is the average of the awards from each game outcome, In an embodiment, the method includes accumulating awards towards a feature game from the game outcomes.

In an embodiment, the award is based on a combination of the game outcomes.

In an embodiment, the method includes accumulating symbols over the game outcomes and wherein the award is based on the accumulated symbols.

In an embodiment, the method includes holding at least one symbol from a first game outcome for a subsequent game outcome.

In an embodiment, the award schedules are different for each game outcome.

In an embodiment, the entitlement is to two game outcomes.

In an embodiment, the entitlement is variable.

In a second aspect, the invention provides a game controller for a gaming system, the game controller arranged to:

receive a bet from a player;

award to the player an entitlement to a plurality of game outcomes in exchange for the bet;

determine that the player has exhausted the entitlement; and determine, subsequent to exhaustion of the entitlement, whether the player is entitled to an award based, at least in part, on at least one of the game outcomes.

In an embodiment, the game controller includes an entitlement monitoring module arranged to determine when the player has exhausted the entitlement.

In an embodiment, the entitlement monitoring module is arranged to determine whether the player has exhausted the entitlement by refusing to obtain at least one of the game outcomes.

In an embodiment, the game controller is arranged to provide the player with an option to accept a current game outcome or to obtain a further game outcome, whereby the player has the option to refuse the further game outcome.

In an embodiment, the game controller is arranged to determine whether the player is entitled to the award based on each of the multiple game outcomes.

In an embodiment, the award is the average of the awards from each game outcome.

In an embodiment, the game controller is arranged to accumulate awards towards a feature game from the game outcomes.

In an embodiment, the award is based on a combination of the game outcomes.

In an embodiment, the game controller is arranged to accumulate over the game outcomes and the award is based on the accumulated symbols.

In an embodiment, the game controller is arranged to hold at least one symbol from a first game outcome for a subsequent game outcome.

In an embodiment, the award schedules are different for each game outcome.

In an embodiment, the entitlement is to two game outcomes.

In an embodiment, the entitlement is variable.

In a third aspect, the invention provides a gaming system comprising:

a player interface comprising a display on which game outcomes may be displayed and an instruction input mechanism operable by a player to input instructions including a bet; and a game controller arranged to:

receive the bet;

award to the player an entitlement to a plurality of game outcomes in exchange for the bet;

determine that the player has exhausted the entitlement; and determine subsequent to exhaustion of the entitlement, whether the player is entitled to an award based, at least in part, on at least one of the game outcomes.

In an embodiment, the game controller includes an entitlement monitoring module arranged to determine when the player has exhausted the entitlement, In an embodiment, the entitlement monitoring module is arranged to determine whether the player has exhausted the entitlement by refusing to obtain at least one of the game outcomes, In an embodiment, the game controller is arranged to provide the player with an option to accept a current game outcome or to obtain a further game outcome, whereby the player has the option to refuse the further game outcome.

In an embodiment, the game controller is arranged to determine whether the player is entitled to the award based on each of the multiple game outcomes.

In an embodiment, the award is the average of the awards from each game outcome.

In an embodiment, the game controller is arranged to accumulate awards towards a feature game from the game outcomes.

In an embodiment, the award is based on a combination of the game outcomes.

In an embodiment, the game controller is arranged to accumulate over the game outcomes and the award is based on the accumulated symbols.

In an embodiment, the game controller is arranged to hold at least one symbol from a first game outcome for a subsequent game outcome.

In an embodiment, the award schedules are different for each game outcome.

In an embodiment, the entitlement is to two game outcomes.

In an embodiment, the entitlement is variable.

In a fourth aspect, the invention provides computer program code which when executed causes a processor to implement the above method.

In a fifth aspect, the invention provides a computer readable medium comprising the computer program code.

In a sixth aspect, the invention provides a data signal comprising the computer program code.

In a seventh aspect, the invention extends to transmitting the computer program code.

BRIEF DESCRIPTION OF THE DRAWINGS

Certain embodiments of the invention will now be described in relation to the following drawings in which:

FIGS. 8A and 8B show exemplary game outcomes of a first example; and

FIG. 9 shows an exemplary game outcome of a sixth example.

Figure 1:
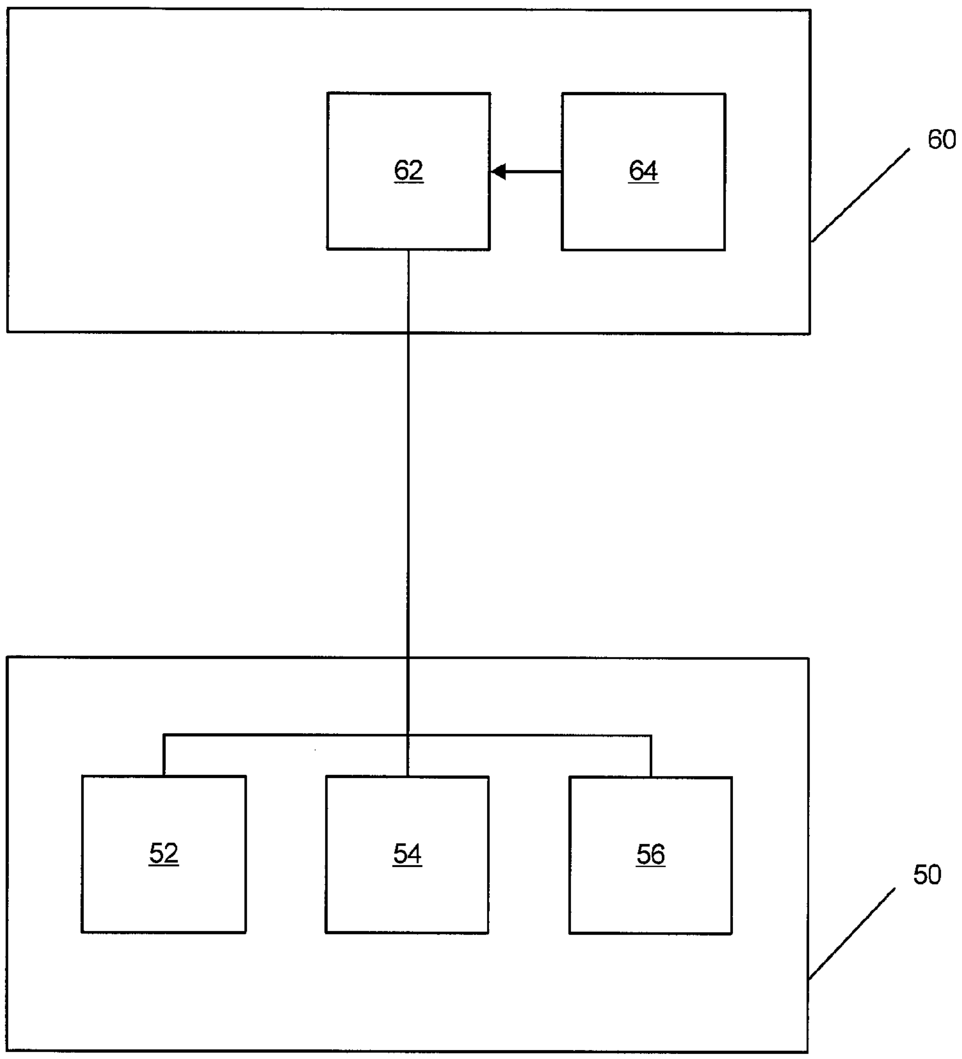
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments provide a gaming system where a player obtains an entitlement to a plurality of game outcomes in return for a single bet. That is, each play of the gaming machine provides the player with an entitlement to a plurality of game outcomes being determined.

Hereafter, game outcomes are referred to as "spins" as the invention is embodied as a slot machine game where the reels are spun. However, persons skilled in the art will appreciate that game outcomes can be determined in a number of different ways, for example, in ball games by drawing subsets of balls from a set of balls in card games, dice games etc. The gaming system may be provided in a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
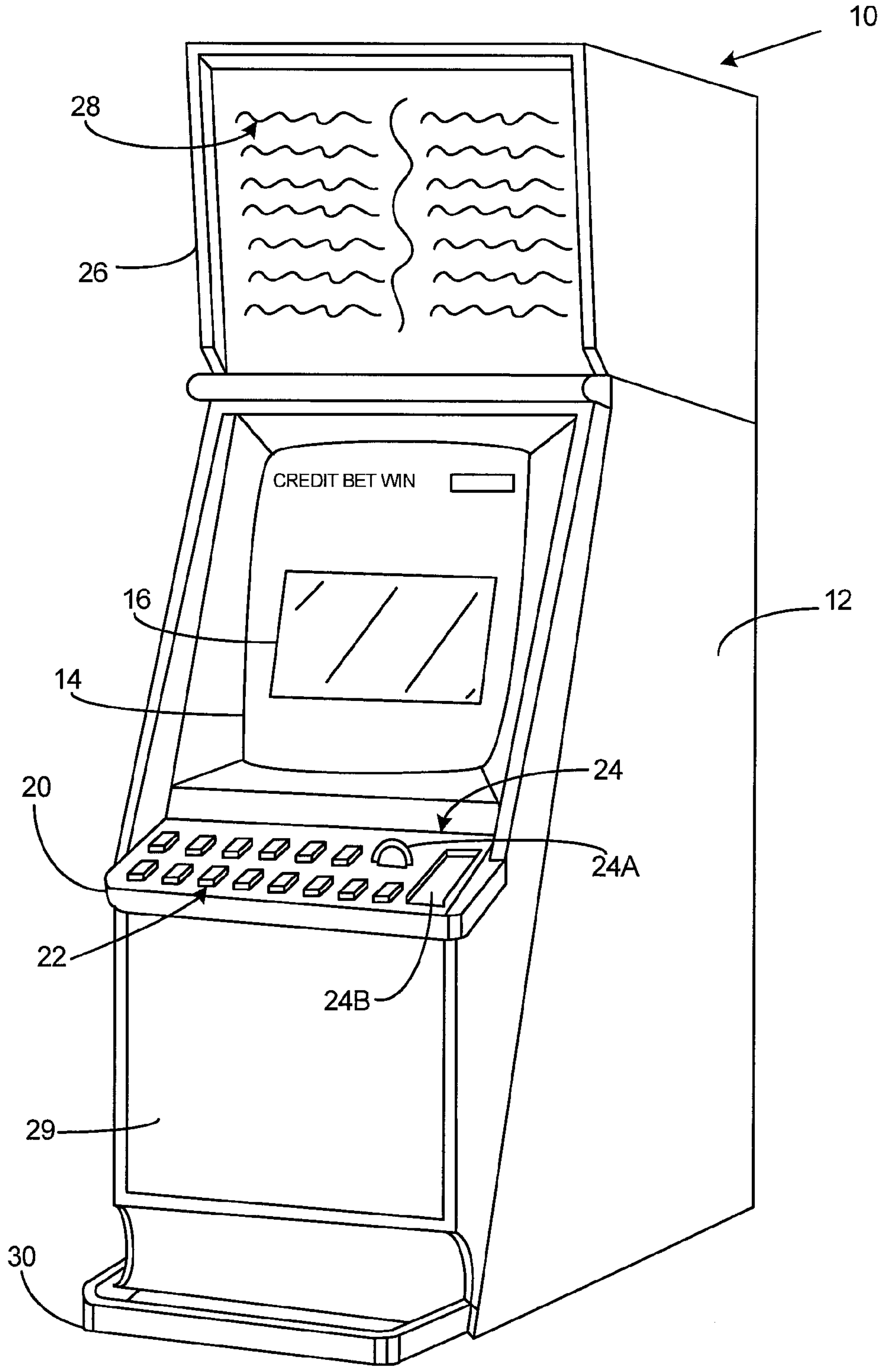
FIG. 2 is a perspective view of a gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
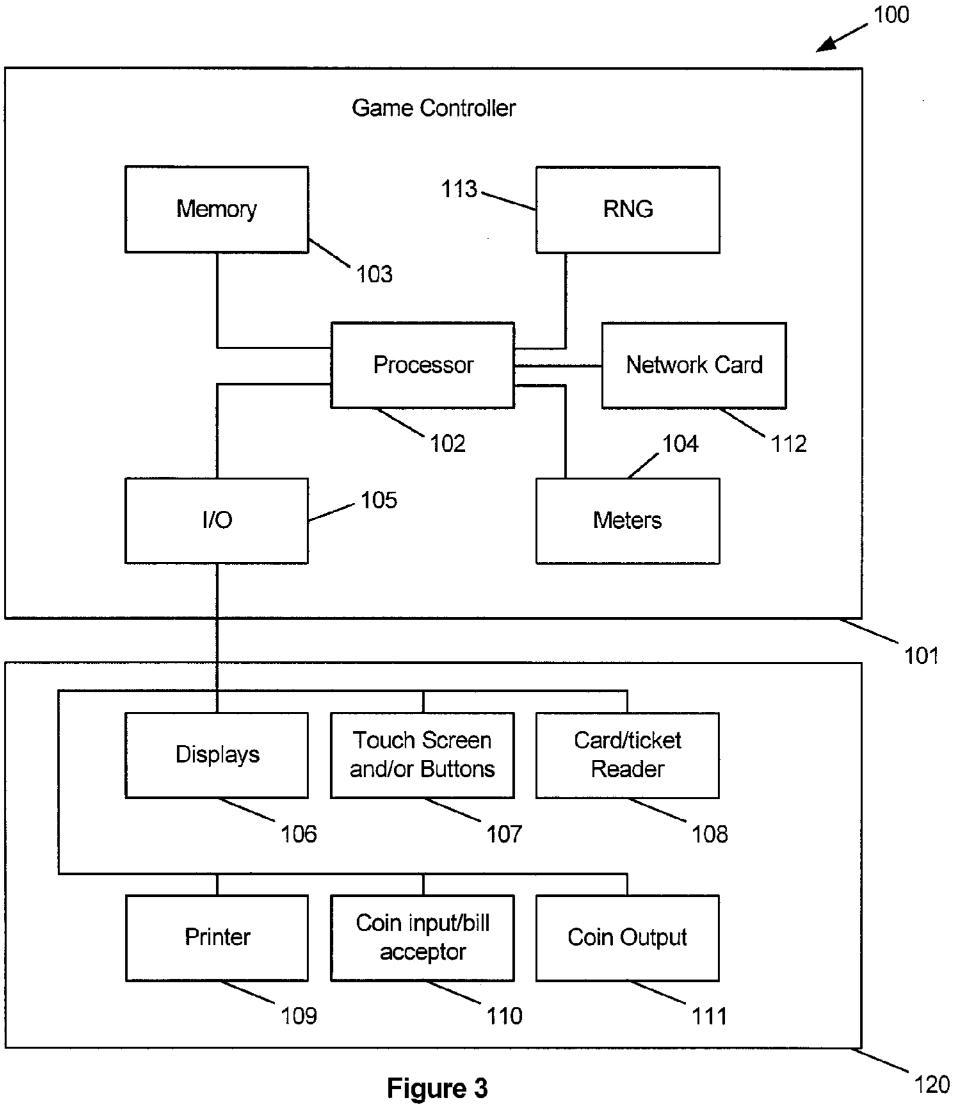
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted depending on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
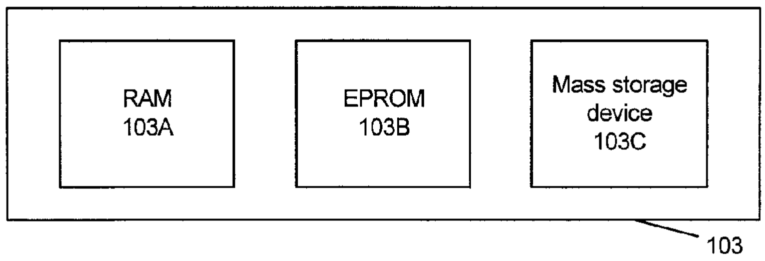
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
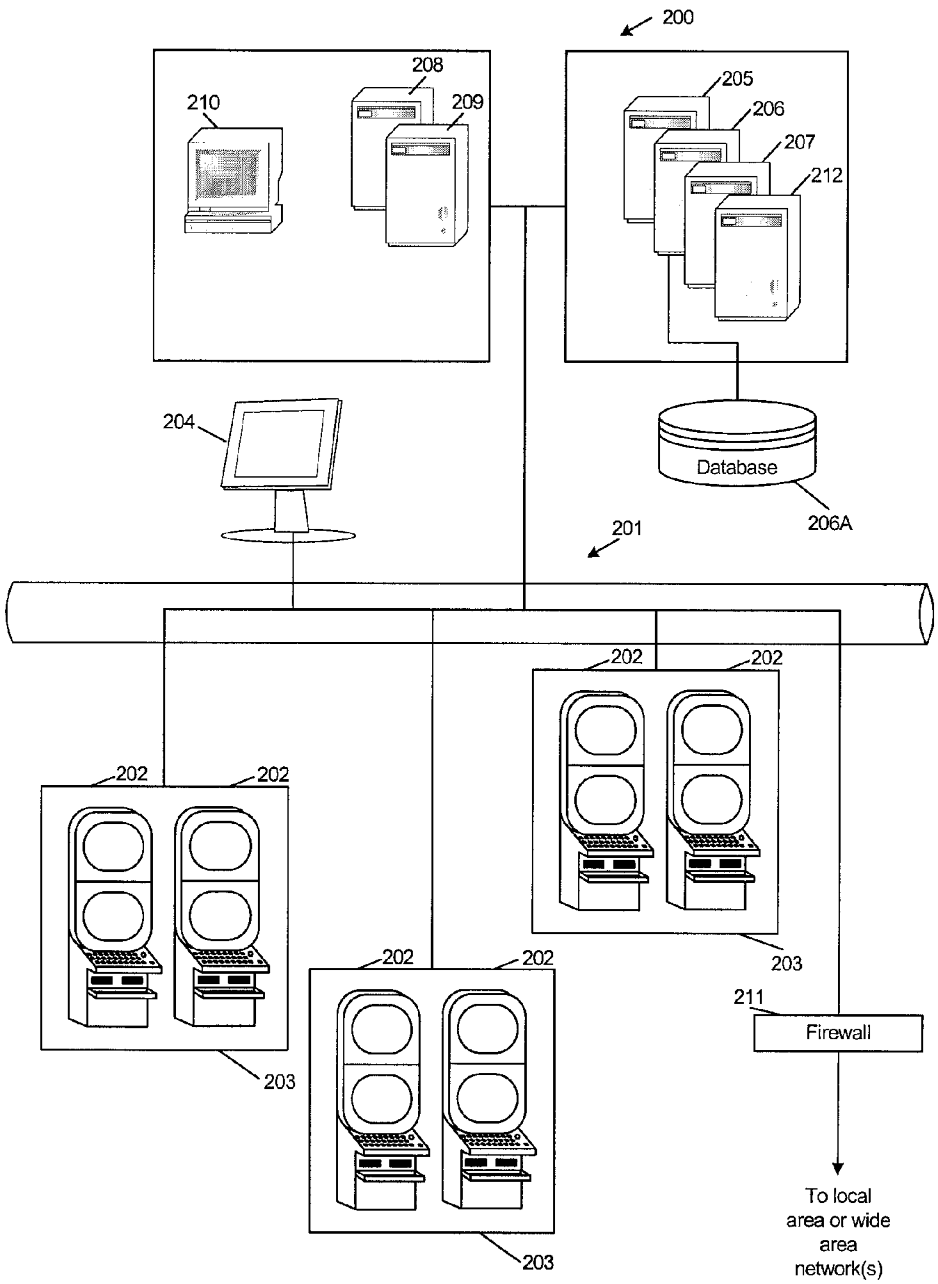
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games depending upon the terminals.

Gaming systems for implementing games that involve a display of spinning reels as part of the display of the outcome of a game have either a video display or a mechanical display, these later machines most usually being "stepper" machines which have a separate motor for each reel.

In some implementations the game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a designate row in a "window" visible to the player on the display that which corresponds to a player playing a single win line. When a reel stops, the symbols will be in one of a plurality of possible symbol positions for that reel relative to the stop position which constitutes a game outcome—i.e. the outcome of the "spin".

Typically such gaming systems allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a designated symbol position of each reel is assigned to a win line. The symbol positions that constitute each of the win lines are usually advertised to the player by markings on the display or diagrams showing the symbol positions that correspond to each win line. However, other techniques are known for establishing the basis on which symbols are evaluated. One technique is found in so-called Reel Power games, where a player selects a number of reels to be played and combinations of symbol positions in the display window are evaluated based on the selected reels. The selection of a reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums.

Persons skilled in the art will appreciate that as well as being embodied as a reel type game, the invention may be embodied as a ball draw game (e.g. bingo or keno), a card game, a dice game, a pin and ball game (e.g. pachinko) etc.

Figure 6:
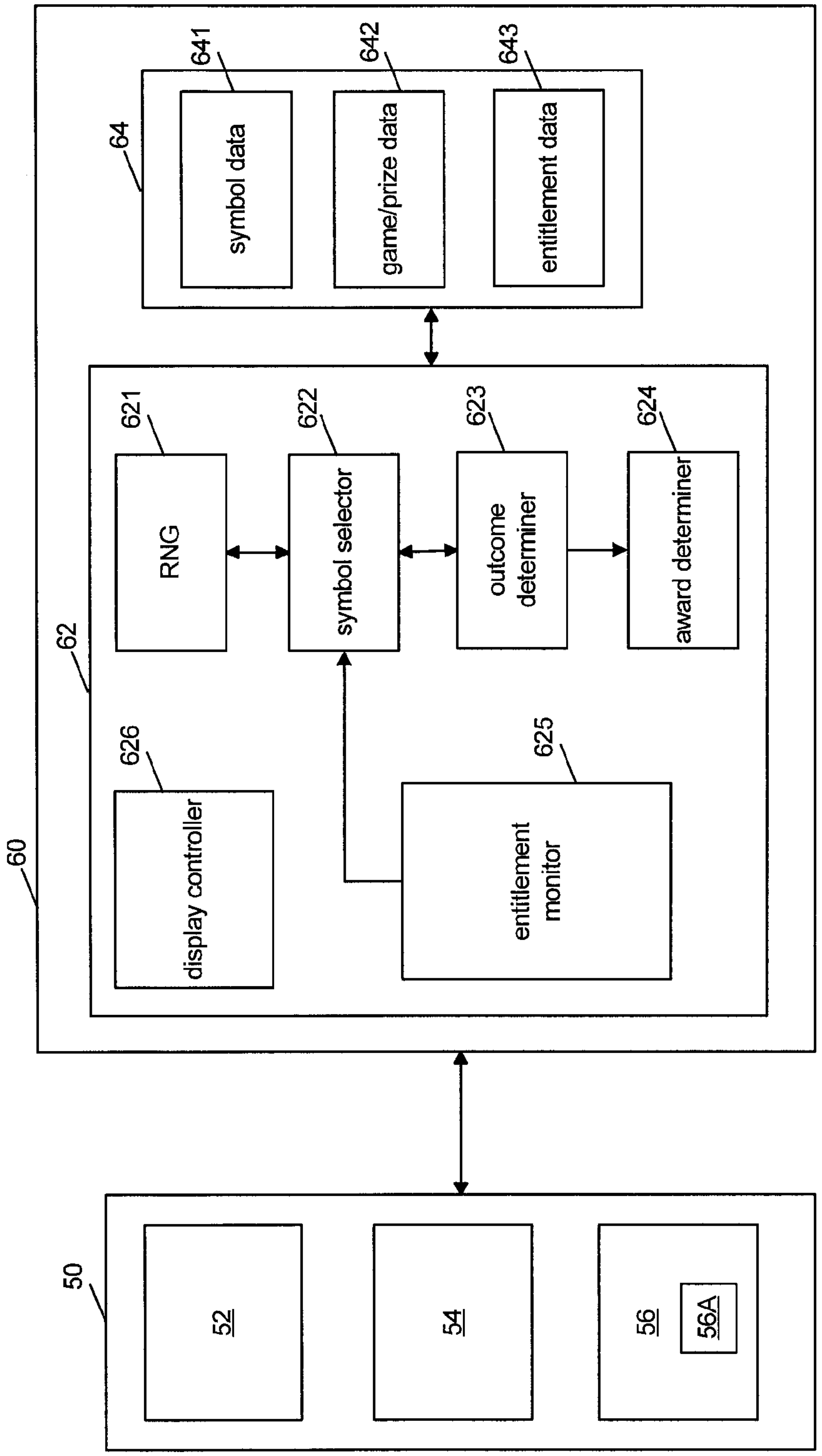
FIG. 6 is a further block diagram of the gaming system.

The game controller 60 of the embodiment is shown in more detail in FIG. 6. It will be apparent that the game controller 60 implements a number of modules including a random number generator module 621, a symbol selector module 622, an outcome determiner module 623, an award determiner module 624 and an entitlement monitoring module 625. Persons skilled in the art will appreciate that while in the embodiments these are implemented as software modules running on processor 62, in other embodiments they could be embodied differently. For example, the random number generator module 621 could be implemented on a separate circuit or as a server. Persons skilled in the art will also appreciate that some of the modules may be implemented as hardware or software/hardware combinations.

The player operates a bet mechanism 56*a* of the instruction input mechanism 56 in order to place a bet on the game. The entitlement monitor 625 of the game controller 60 receives the bet and determines based on entitlement data 643, the player's entitlement to two or more spins. The player then operates the input mechanism 56 in accordance with the normal manner of playing game to play a first spin. In one embodiment, the first spin is played automatically upon the player placing the bet.

The entitlement monitor 625 controls the symbol selector 622 to select symbols from the symbol data 641 specifying the configuration of the reels employing the random number generator 621. The outcome determiner 623 determines a game outcome based on the selected symbols, and the game and prize data 642. The game outcome is then output to the player on the display 54 under the control of the display controller 626. The entitlement monitor 625 determines whether this game outcome has exhausted the player's entitlement and if not, it updates the entitlement data 643 to indicate the players remaining entitlement.

The manner in which the player exhausts the entitlement varies depending on the particular implementation. In some embodiments, the player may be required to play all their spins and hence the entitlement monitor checks that there is a remaining spin. In other embodiments, the player may be entitled to refuse a further spin to thereby exhaust their entitlement. Once the entitlement is exhausted, award determiner 624 determines an award, if any, to make to the player.

In the case where the entitlement is to two spins this allows an award for the player to be determined in a number of ways, including:

- The player wins the higher award of the two spins—if there is no award, then no win is achieved
- A player chooses to take the outcome of the first win or chooses to forgo the win for the possible outcome of the second spin
- All awards from both spins are accumulated and the average is paid
- The award schedule for the two spins are different.
- Features can be triggered over the spins, for example, accumulate three or more "pyramid" symbols over the spins.
- The spins can be related to one another, for example, wins in both games are multiplied double etc, or wins in either of the games are multiplied by the number of a special symbol appearing in the other game.
- The occurrence of a special symbol in the set can be counted and that the conclusion to the spins the total number of the special symbols accumulated in the spins is compared to an award table In some embodiments, symbols may be held from one spin to another, for example, as a "background" symbol or a "sticky wild".

In the embodiment, the number of spins per bet is two but in other embodiments, the number of spins greater than two may be employed. Further, the number of spins per bet may be variable. For example, based on the size of the bet, based on a random selection or based on a player preference.

Figure 7:
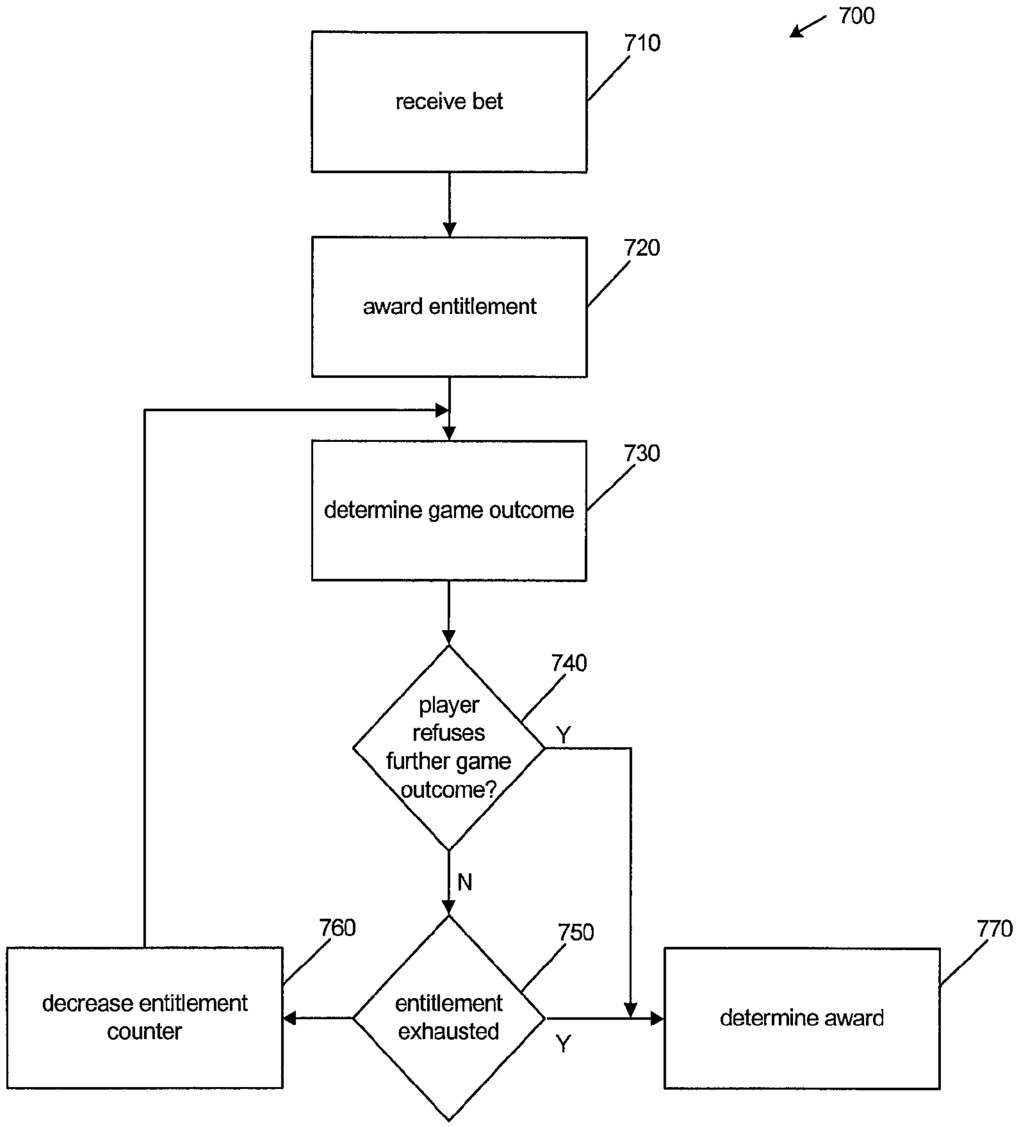
FIG. 7 is a flowchart.

The method 700 of the embodiment is summarised in FIG. 7. A player's bet is received 710 and an entitlement is awarded 720. A first game outcome is determined 730. Depending on the embodiment, the player may then have the opportunity to refuse a further game outcome 740. In such embodiments, if the player refuses a further game outcome, the entitlement is deemed exhausted and the award is determined 770 based solely on the first game outcome. Otherwise, the method proceeds by determining whether the entitlement is exhausted 750 and if it is not, decreasing an entitlement counter 760 and determining a subsequent game outcome 730. When the entitlement is exhausted at step 750 an award is determined 770.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

The player's eligibility for obtaining plural game outcomes for a bet can be determined in accordance with any one of a number of lnown rules including but not limited to:

being available at the player's discretion;

being available to all players for all bets;

being available in feature games;

being available only for certain bet types; or different numbers of spins being available for different bets or at different stages of the game. For example: standard bets may be entitled to two spins and ante bets may be entitled to three spins; or base games get 2 spins and feature games get 3 spins.

Further, the plural spins can be provided in a feature game which can commence in accordance with any one of a number of known rules including but not limited to:

when a special symbol, or a combination of symbols appears in the window;

when a time elapses;

when a system event occurs;

when an underlying random event occurs, for example, in the course of a game;

when a turnover has elapsed.

The feature game may be a series free games, a series of re-spins or a second screen feature such as are known in the art.

EXAMPLES

Example 1

Spinning Reel Game with 2 Spins Per Bet Paying Highest

The player is playing a spinning reel game with five reels and 3 bet lines as shown in FIGS. 8*a* and 8*b*. The player chooses to bet 9 credits being 3 lines with 3 credits per line.

The player commits the bet and the reels spin showing 800A for the first spin in FIG. 8*a*.

This set of symbols is compared to an awards schedule and would pay 30 credit for 3*A on the centre line 820 and 15 credits for 3*J on the bottom line 830 being a total of potential win of 45 credits.

The reels spin for the second time and the result is shown in FIG. 8*b*.

This set of symbols 800B is compared to an awards schedule and would pay 6 credits for the 2*9 on the centre line. The total potential win is 6 credits.

The game controller now compares the 2 potential wins and pays the player 45 credits.

Example 2

Spinning Reel Game with 2 Spins Per Bet Paying Average

As per example 1, however, the machine averages the potential wins of 45 credits and 6 credits and awards the player 26 credits (being the rounded up value if the average of 45 and 6).

Example 3

Spinning Reel Game with 2 Spins Per Bet but Player Decides when to Take the Win As per example 1, the player places a bet and the first outcome is a potential prize of 45 credits. The player is asked if they would like to take the win or play on. The player chooses to play on, thus forfeiting the 45 credits. The outcome of the second spin is a win of 6 credits and the player wins the 6 credits.

Example 4

Spinning Reel Game with 2 Spins Per Bet Accumulating Stars

The player places a bet and the first outcome includes 2 stars.

The screen (FIG. 8*a*) shows an indication that 2 stars have been accrued.

The second spin (FIG. 5*b*) includes 3 stars, thus 5 stars have been accrued.

The 5 stars are compared to an award schedule and the player is paid 600 credits for the 5 stars.

Example 5

Spinning Reel Game with 2 Spins and Outcome in One Affects Outcome in the Other In this case, stars in each spin (as in FIG. 8) determine the value by which prizes in the other game are multiplied.

The player places a bet and the first outcome includes 2 stars. This means that the prize in the $2^{nd}$ spin is multiplied by 2. The second spin includes 3 stars and the outcome of the first spin is multiplied by 3.

Example 6

Spin and Hold as Background

In this game, the Star is a symbol which can be held in the background with a view to improving the results in the $2^{nd}$ spin.

The player places a bet and the first outcome includes 2 stars. As shown in FIG. 9, the background symbols are held 910, 920 and the reels spin. In this case the $2^{nd}$ spin results are the same as the case above, however, with the background stars we have the outcome 900.

The player has won an award for 5 stars in addition to the awards of Example 5.

Other variations will be apparent to a person skilled in the art and should be understood as falling within the scope of the invention described herein. For example, the symbol selection game could be a card game or a ball draw game such as keno, bingo or arishinko.

It will be understood to persons skilled in the art of the invention that many modifications may be made without departing from the spirit and scope of the invention, in particular it will be apparent that certain features of embodiments and examples of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. As noted above, certain embodiments of the present invention may be implemented using an existing computer processor and/or by a special purpose computer processor incorporated for this or another purpose or by a hardwired system, for example.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The claims defining the invention are as follows:

1. A method of gaming comprising:

receiving a bet from a player;

awarding to the player an entitlement to a number of plays of a game in exchange for the bet, wherein the number of plays awarded is determined based on at least one predetermined criteria;

initiating a first of the number of plays of the game and generating a corresponding first outcome for the first play of the game;

initiating remaining plays of the game sequentially after the first play of the game and generating corresponding remaining outcomes for the remaining plays of the game, wherein each of the first and the remaining outcomes has an associated award;

comparing the awards associated with the first and the remaining outcomes; and determining the higher of the awards associated with the first and the remaining outcomes and whether the player is entitled to one of the awards based, at least in part, on at least one of the game outcomes.

2. A method as claimed in claim 1, comprising determining whether the player has exhausted the entitlement by refusing to obtain at least one of the game outcomes.

3. A method as claimed in claim 2, comprising providing the player with an option to accept the first outcome or to obtain a second outcome, whereby the player has the option to refuse the second outcome.

4. A method as claimed in claim 1, comprising determining whether the player is entitled to one of the awards based on each of the multiple game outcomes.

5. A method as claimed in claim 1 wherein the award is the average of first and second awards associated with the first outcome and a second outcome of the remaining outcomes.

6. A method as claimed in claim 1 comprising accumulating first and second awards from the first and remaining outcomes towards a feature game from the game outcomes.

7. A method as claimed in claim 1 wherein first and second awards are based on a combination of the first outcome and a second outcome of the remaining outcomes.

8. A method as claimed in claim 1 comprising accumulating a designated symbol over the first outcome and a second outcome of the remaining outcomes and wherein the award is based on the accumulated symbols.

9. A method as claimed in claim 1 comprising holding a designated symbol from the first play of the game for remaining plays of the game.

10. A method as claimed in claim 1, wherein the award schedules are different for each game outcome.

11. A method as claimed in claim 1 wherein the entitlement is variable.

12. A computer readable storage disc comprising computer program code which when executed causes a processor to implement the method of claim 1.

13. A game controller for a gaming system, the game controller arranged to:

receive a bet from a player;

award to the player an entitlement to a number of plays of a game in exchange for the bet, wherein the number of plays awarded is determined based on at least one predetermined criteria;

initiate a first of the number of play of the game and generating a corresponding first outcome for the first play of the game;

initiate remaining plays of the game sequentially after the first play of the game and generating corresponding remaining outcomes for the remaining plays of the game, wherein each of the first and the remaining outcomes has an associated award;

compare the awards associated with the first and the remaining outcomes; and determine the higher of the awards associated with the first and the remaining outcomes and whether the player is entitled to one of the awards based, at least in part, on at least one of the game outcomes.

14. A game controller as claimed in claim 13, comprising an entitlement monitoring module arranged to determine when the player has exhausted the entitlement.

15. A game controller as claimed in claim 14, wherein the entitlement monitoring module is arranged to determine whether the player has exhausted the entitlement by refusing to obtain at least one of the game outcomes.

16. A game controller as claimed in claim 15, arranged to provide the player with an option to accept the first outcome or to obtain a second outcome, whereby the player has the option to refuse the second outcome.

17. A game controller as claimed in claim 13, arranged to determine whether the player is entitled to one of the awards based on each of the multiple game outcomes.

18. A game controller as claimed in claim 13, wherein the award is the average of first and second awards associated with the first outcome and a second outcome of the remaining outcomes.

19. A game controller as claimed in claim 13, wherein the game controller is arranged to accumulate first and second awards towards a feature game from the game outcomes.

20. A game controller as claimed in claim 13, wherein first and second awards are based on a combination of the first outcome and a second outcome of the remaining outcomes.

21. A game controller as claimed in claim 13, wherein the game controller is arranged to accumulate a designated symbol over the first outcome and a second outcome of the remaining outcomes and the award is based on the accumulated symbols.

22. A game controller as claimed in claim 13, wherein the game controller is arranged to hold a designated symbol from the first play of the game for remaining plays of the game.

23. A game controller as claimed in claim 13, wherein the award schedules are different for each game outcome.

24. A game controller as claimed in claim 13, wherein the entitlement is variable.

25. A gaming system comprising:

a player interface comprising a display on which game outcomes may be displayed and an instruction input mechanism operable by a player to input instructions including a bet; and a game controller arranged to:

receive a bet from a player;

award to the player an entitlement to a number of plays of a game in exchange for the bet, wherein the number of plays awarded is determined based on at least one predetermined criteria;

initiate a first of the number of plays of the game and generating a corresponding first outcome for the first play of the game;

initiate remaining plays of the game sequentially after the first play of the game and generating corresponding remaining outcomes for the remaining plays of the game, wherein each of the first and the remaining outcomes has an associated award;

compare the awards associated with the first and the remaining outcomes; and determine the higher of the awards associated with the first and the remaining outcomes and whether the player is entitled to one of the awards based, at least in part, on at least one of the game outcomes.

26. A gaming system as claimed in claim 25, wherein the game controller comprises an entitlement monitoring module arranged to determine when the player has exhausted the entitlement.

27. A gaming system as claimed in claim 26, wherein the entitlement monitoring module is arranged to determine whether the player has exhausted the entitlement by refusing to obtain at least one of the game outcomes.

28. A gaming system as claimed in claim 27, wherein the game controller is arranged to provide the player with an option to accept the first outcome or to obtain a second outcome, whereby the player has the option to refuse the second outcome.

29. A gaming system as claimed in claim 25, wherein the game controller is arranged to determine whether the player is entitled to one of the awards based on each of the multiple game outcomes.

30. A gaming system as claimed in claim 25, wherein the award is the average of first and second awards associated with the first outcome and a second outcome of the remaining outcomes.

31. A gaming system as claimed in claim 25, wherein the game controller is arranged to accumulate first and second awards towards a feature game from the game outcomes.

32. A gaming system as claimed in claim 25, wherein first and second awards are based on a combination of the first outcome and a second outcome of the remaining outcomes.

33. A gaming system as claimed in claim 25, wherein the game controller is arranged to accumulate a designated symbol over the first outcome and a second outcome of the remaining outcomes and the award is based on the accumulated symbols.

34. A gaming system as claimed in claim 25, wherein the game controller is arranged to hold a designated symbol from the first play of the game for remaining plays of the game.

35. A gaming system as claimed in claim 25, wherein the award schedules are different for each game outcome.

36. A gaming system as claimed in claim 25, wherein the entitlement is variable.

* * * * *

UNITED STATES PATENT AND TRADEMARK OFFICE

CERTIFICATE OF CORRECTION

PATENT NO. : 8,550,902 B2
APPLICATION NO. : 12/190943
DATED : October 8, 2013
INVENTOR(S) : Nicholas Luke Bennett It is certified that error appears in the above-identified patent and that said Letters Patent is hereby corrected as shown below:

In the Claims:
Column 13, line 11 (claim 13), after “the number of” please add an “s” to the word play so that the phrase reads “number of plays”.

Signed and Sealed this
Twenty-eighth Day of January, 2014

Michelle K. Lee
*Deputy Director of the United States Patent and Trademark Office*